(12) United States Patent
Yasuda et al.

(10) Patent No.: US 12,315,296 B2
(45) Date of Patent: May 27, 2025

(54) CONTEMPORANEOUSLY CALIBRATING A GAZE-TRACKING SYSTEM AND AUTHORIZING ACCESS TO ANOTHER SYSTEM

(71) Applicant: Toyota Research Institute, Inc., Los Altos, CA (US)

(72) Inventors: Hiroshi Yasuda, San Francisco, CA (US); Manuel Ludwig Kuehner, Mountain View, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 500 days.

(21) Appl. No.: 17/582,372

(22) Filed: Jan. 24, 2022

(65) Prior Publication Data

US 2023/0237847 A1 Jul. 27, 2023

(51) Int. Cl.
*G06V 40/18* (2022.01)
*B60K 35/00* (2024.01)
(Continued)

(52) U.S. Cl.
CPC ............ *G06V 40/197* (2022.01); *B60K 35/00* (2013.01); *B60R 25/04* (2013.01); *B60R 25/24* (2013.01);
(Continued)

(58) Field of Classification Search
CPC ...... G06V 20/597; G06V 40/20; G06V 40/18; G06V 40/19; B60K 2360/149;
(Continued)

(56) References Cited

U.S. PATENT DOCUMENTS 9,280,652 B1 3/2016 Bozarth
2015/0049013 A1* 2/2015 Rahman ................. G06F 1/163
345/156

(Continued)

OTHER PUBLICATIONS

Kasprowski et al., "Implicit Calibration Using Probable Fixation Targets," Sensors, vol. 19, No. 1, Jan. 2019, pp. 1-27.

(Continued)

*Primary Examiner* — Wassim Mahrouka
(74) *Attorney, Agent, or Firm* — Christopher G. Darrow; Darrow Mustafa PC

(57) ABSTRACT

A system for contemporaneously calibrating a gaze-tracking system and authorizing access to a first other system can include a processor and a memory. The memory can store a preliminary operations module, an authorization module, and a gaze-tracking module. The preliminary operations module can include instructions to compare a trajectory, of a point of gaze of an eye, with a pattern associated both with a calibration of the gaze-tracking system and with a first authorization process, that excludes an iris recognition process, for the first other system. The authorization module can include instructions to cause an access to the first other system to be authorized. The gaze-tracking module can include instructions to: (1) cause the gaze-tracking system to be calibrated and (2) cause, in response to the gaze-tracking system being calibrated, the gaze-tracking system to be configured to be a user interface for a second other system.

20 Claims, 5 Drawing Sheets

(51) Int. Cl.
- B60K 35/10 (2024.01)
- B60K 35/22 (2024.01)
- B60K 35/90 (2024.01)
- B60R 25/04 (2013.01)
- B60R 25/24 (2013.01)
- G06F 3/01 (2006.01)
- G06T 7/20 (2017.01)
- G06V 20/59 (2022.01)

(52) U.S. Cl.
CPC ............... *G06F 3/013* (2013.01); *G06T 7/20* (2013.01); *G06V 20/597* (2022.01); *B60K 35/10* (2024.01); *B60K 35/22* (2024.01); *B60K 35/90* (2024.01); *B60K 2360/149* (2024.01); *G06T 2207/30201* (2013.01); *G06T 2207/30241* (2013.01); *G06T 2207/30268* (2013.01)

(58) Field of Classification Search
CPC .......... B60K 35/90; G06T 2207/30268; G06T 2207/30041; G06T 2207/30241; G06F 3/013; G02B 27/0093; H04N 13/383; G05B 2219/35503
See application file for complete search history.

(56) References Cited

U.S. PATENT DOCUMENTS

| | | |
|---|---|---|
| 2015/0296135 A1 | 10/2015 | Wacquant et al. |
| 2019/0228242 A1 | 7/2019 | Yamaoka et al. |
| 2020/0380728 A1 | 12/2020 | Alonso |
| 2021/0088784 A1 | 3/2021 | Whitmire et al. |
| 2021/0264008 A1* | 8/2021 | Kurylko ............... G06V 40/174 |
| 2023/0177128 A1* | 6/2023 | Vankipuram ........... G06F 3/011 |
| | | 713/186 |

OTHER PUBLICATIONS

Khan et al., "Gaze and Eye Tracking: Techniques and Applications in ADAS," Sensors, vol. 19, No. 24, Dec. 2019, pp. 1-36.

Vehlen et al., "Evaluation of an eye tracking setup for studying visual attention in face-to-face conversations," Scientific Reports, vol. 11, Jan. 29, 2021, pp. 1-16.

Huang et al.,, "Building a Self-Learning Eye Gaze Model from User Interaction Data," MM '14: Proceedings of the 22nd ACM international conference on Multimedia, Nov. 2014, pp. 1-5.

* cited by examiner

CONTEMPORANEOUSLY CALIBRATING A GAZE-TRACKING SYSTEM AND AUTHORIZING ACCESS TO ANOTHER SYSTEM

TECHNICAL FIELD

The disclosed technologies are directed to contemporaneously calibrating a gaze-tracking system and authorizing access to another system.

BACKGROUND

It is believed that a movement of an eye of a person can be indicative of a thought process of the person. A gaze-tracking system can determine a direction of a gaze of an eye. A direction of a gaze of an eye can include a combination of a measure of a rotation of the eye with respect to a frame of reference and a measure of a facing direction of a head that has the eye. Typically, a gaze-tracking system can cause beams of light to be directed to an eye and can record reflections of such beams of light. The direction of the gaze of the eye can be determined from directions of the reflections with respect to a center of a pupil of the eye. A gaze-tracking system can be used for ergonomics, medical research, marketing research, human-computer interaction (HCI), or the like. For example, a gaze-tracking system can be included in assistive technology for people with impaired muscle control. For example, a gaze-tracking system can be used to determine a degree of drowsiness of an operator of a vehicle.

SUMMARY

In an embodiment, a system for contemporaneously calibrating a gaze-tracking system and authorizing access to a first other system can include a processor and a memory. The memory can store a preliminary operations module, an authorization module, and a gaze-tracking module. The preliminary operations module can include instructions that cause the processor to compare a trajectory, of a point of gaze of an eye, with a pattern associated both with a calibration of the gaze-tracking system and with a first authorization process, that excludes an iris recognition process, for the first other system. The authorization module can include instructions that cause the processor to cause an access to the first other system to be authorized. The gaze-tracking module can include instructions that cause the processor to cause the gaze-tracking system to be calibrated. The gaze-tracking module can include instructions that cause the processor to cause, in response to the gaze-tracking system being calibrated, the gaze-tracking system to be configured to be a user interface for a second other system.

In another embodiment, a method for contemporaneously calibrating a gaze-tracking system and authorizing access to a first other system can include comparing, by a processor, a trajectory, of a point of gaze of an eye, with a pattern associated both with a calibration of the gaze-tracking system and with a first authorization process, that excludes an iris recognition process, for the first other system. The method can include causing, by the processor, an access to the first other system to be authorized. The method can include causing, by the processor, the gaze-tracking system to be calibrated. The method can include causing, by the processor and in response to the gaze-tracking system being calibrated, the gaze-tracking system to be configured to be a user interface for a second other system.

In another embodiment, a non-transitory computer-readable medium for contemporaneously calibrating a gaze-tracking system and authorizing access to a first other system can include instructions that, when executed by one or more processors, cause the one or more processors to compare a trajectory, of a point of gaze of an eye, with a pattern associated both with a calibration of the gaze-tracking system and with a first authorization process, that excludes an iris recognition process, for the first other system. The non-transitory computer-readable medium can also include instructions that, when executed by one or more processors, cause the one or more processors to cause an access to the first other system to be authorized. The non-transitory computer-readable medium can also include instructions that, when executed by one or more processors, cause the one or more processors to cause the gaze-tracking system to be calibrated. The non-transitory computer-readable medium can also include instructions that, when executed by one or more processors, cause the one or more processors to cause, in response to the gaze-tracking system being calibrated, the gaze-tracking system to be configured to be a user interface for a second other system.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

The disclosed technologies are directed to contemporaneously calibrating a gaze-tracking system and authorizing access to a first other system. A trajectory, of a point of gaze of an eye, can be compared with a pattern associated both with a calibration of the gaze-tracking system and with an authorization process, that excludes an iris recognition process, for the first other system. An access to the first other system can be caused to be authorized. The gaze-tracking system can be caused to be calibrated. In response to the gaze-tracking system being calibrated, the gaze-tracking system can be caused to be configured to be a user interface for a second other system. For example, both the gaze-tracking system and the first other system can be components of an encompassing system. For example, the encompassing system can be a vehicle.

For example, the pattern can include a path formed by a movement of the eye to view, in a sequence, specific objects. For example, at least one or all of the specific objects can be disposed on the vehicle. Additionally or alternatively, for example, at least one or all of the specific objects can be caused to be presented on a display. For example, the display can include one or more of a head up display, a console display, or an instrument panel.

For example, the gaze-tracking system can be configured to be an operator monitoring system. For example, the operator monitoring system can be used to determine a degree of drowsiness of an operator of the vehicle. For example, the second other system can include an in-car entertainment system. Additionally or alternatively, for example, the second other system can include the first other system.

For example, the first other system can include a system configured to change a state of a source of a propulsion force for the vehicle from an off state to an on state. Additionally or alternatively, for example, the first other system can include a personalization system configured to cause a setting of a third other system to be set to a specific value. For example, the third other system can include one or more components of the vehicle. For example, the one or more components and associated one or more settings can include a position of a seat, a height of the seat, a degree to which the seat reclines, a position of a ventilation duct, a direction of the ventilation duct, a temperature of a heating system or an air conditioning system, a speed of a fan of a ventilation system, a position of a rearview mirror, a tilt angle of a steering wheel, a longitudinal position of the steering wheel, a volume of a speaker, a tuner of a radio, or the like.

Figure 1:
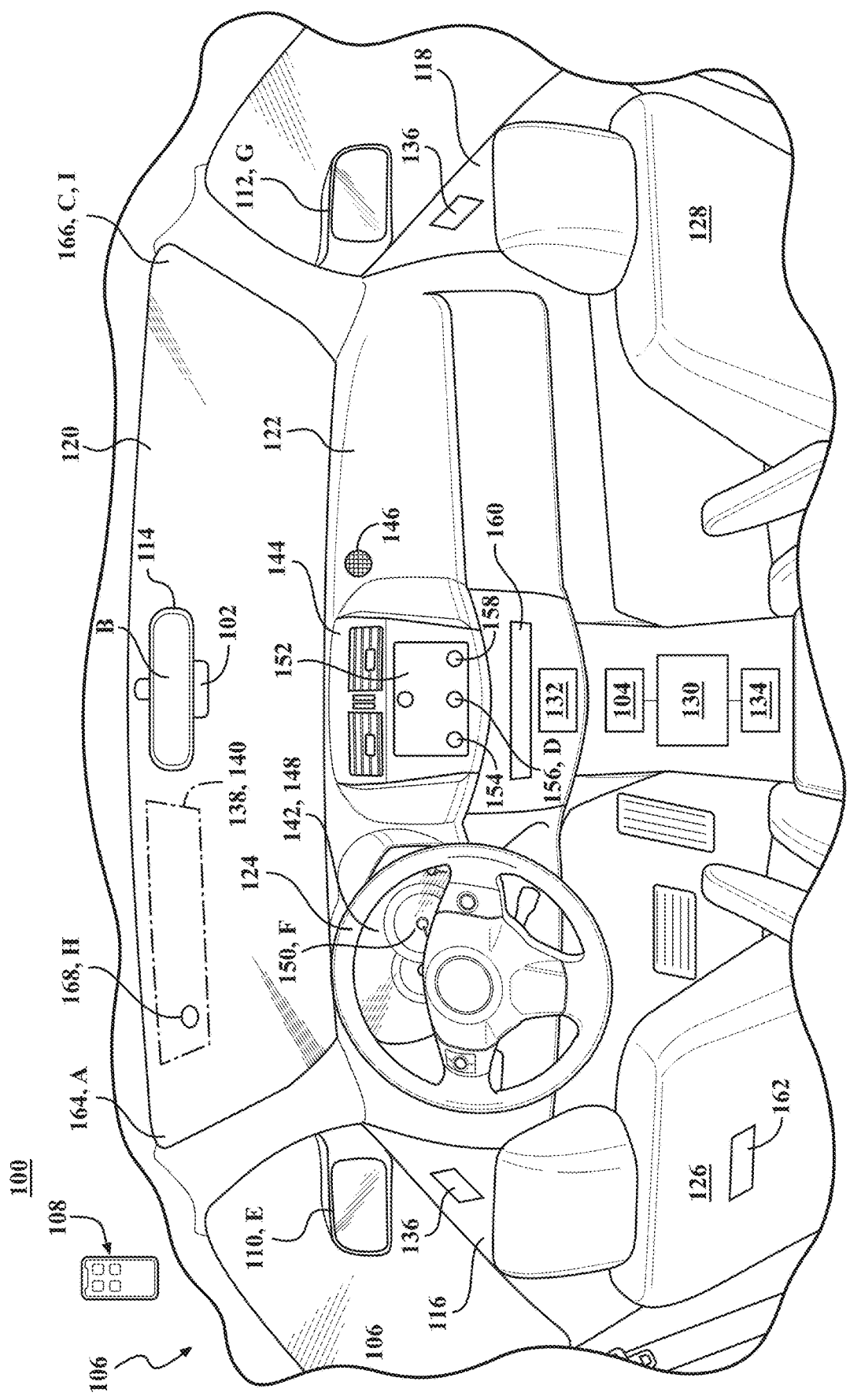
FIG. 1 includes a diagram that illustrates an example of an environment for contemporaneously calibrating a gaze-tracking system and authorizing access to a first other system, according to the disclosed technologies.

FIG. 1 includes a diagram that illustrates an example of an environment 100 for contemporaneously calibrating a gaze-tracking system 102 and authorizing access to a first other system 104, according to the disclosed technologies. The environment 100 can include, for example, a vehicle 106 and a user device 108. The vehicle 106 can include, for example, a left outdoor rearview mirror 110, a right outdoor rearview mirror 112, an indoor rearview mirror 114, a left door 116, a right door 118, a windshield 120, a dashboard 122, a steering wheel 124, a seat 126 for an operator of the vehicle 106, a seat 128 for a passenger of the vehicle 106, a source 130 of a propulsion force for the vehicle 106, a recording device 132, and a remote keyless ignition system 134. One or more of the left door 116 or the right door 118 can include, for example, a remote keyless entry system 136. The windshield 120 can include, for example, a portion 138 configured for a head up display 140. The dashboard 122 can include, for example, an instrument panel 142, a central console 144, and a speaker 146. The instrument panel 142 can include, for example, an instrument display 148. The instrument display 148 can be configured to display, for example, a speedometer gage 150. The central console 144 can include, for example, a console display 152. The console display 152 can be configured to display, for example, an interface 154 for the recording device 132, a volume control device 156 for a volume of the speaker 146, and a control device 158 for an in-car entertainment system 160. The seat 126 for the operator of the vehicle 106 can include a haptic device 162.

Figure 2:
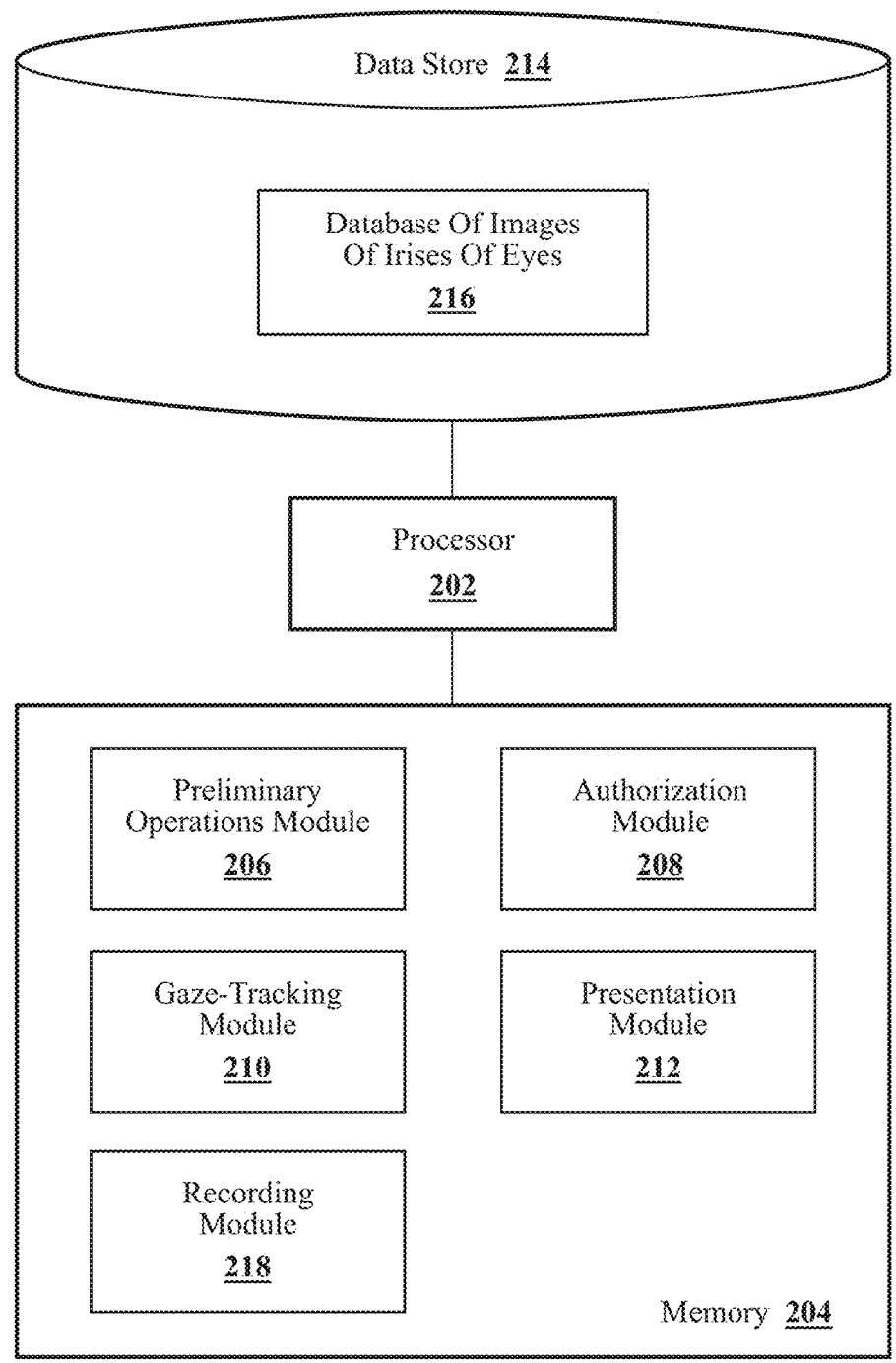
FIG. 2 includes a block diagram that illustrates an example of a system for contemporaneously calibrating a gaze-tracking system and authorizing access to a first other system, according to the disclosed technologies.

FIG. 2 includes a block diagram that illustrates an example of a system 200 for contemporaneously calibrating a gaze-tracking system and authorizing access to a first other system, according to the disclosed technologies. The system 200 can include, for example, a processor 202 and a memory 204. The memory 204 can be communicably coupled to the processor 202. The memory 204 can store, for example, a preliminary operations module 206, an authorization module 208, and a gaze-tracking module 210. For example, the processor 202 and the memory 204 can be configured to be disposed on a vehicle.

For example, the preliminary operations module 206 can include instructions that function to control the processor 202 to compare a trajectory, of a point of gaze of an eye, with a pattern associated both with a calibration of the gaze-tracking system and with a first authorization process, that excludes an iris recognition process, for the first other system.

For example, the authorization module 208 can include instructions that function to control the processor 202 to cause an access to the first other system to be authorized.

For example, the gaze-tracking module 210 can include instructions that function to control the processor 202 to cause the gaze-tracking system to be calibrated.

For example, the gaze-tracking module 210 can include instructions that function to control the processor 202 to cause, in response to the gaze-tracking system being calibrated, the gaze-tracking system to be configured to be a user interface for a second other system.

For example, the second other system can include the first other system.

In a configuration, for example, the gaze-tracking system can be further configured to include an operator monitoring system. For example, if the processor 202 and the memory 204 are disposed on a vehicle, then the operator monitoring system can be used to determine a degree of drowsiness of an operator of the vehicle.

For example, a lower body portion, of a person who has the eye, can be stationary at a specific location at a time at which a recording of the trajectory is produced. For example, the pattern can include a path formed by a movement of the eye, when the person is at the specific location, to view, in a sequence, specific objects. For example, a specific object, of the specific objects, can have a corresponding location along the path of the pattern. For example, the specific objects can be real objects, objects presented on a display, or both.

For example, the memory 204 can further store a presentation module 212. The presentation module 212 can include instructions that function to control the processor 202 to cause at least one of the specific objects to be presented on a display. For example, the display can include one or more of a head up display, a console display, an instrument panel, or the like.

With reference to FIGS. 1 and 2, for example, if the processor 202 and the memory 204 are disposed on the vehicle 106, then the lower body portion, of the person who has the eye, can be stationary at the seat 126. For example, the pattern can include the path formed by the movement of the eye, when the person is at the seat 126, to view, in a sequence, specific objects: an upper left corner 164 (A) of the windshield 120, the indoor rearview mirror 114 (B), an upper right corner 166 (C) of the windshield 120, the volume control device 156 (D) displayed on the console display 152, and the left outdoor rearview mirror 110 (E).

For example, the pattern can be one of a first pattern or a second pattern. The first pattern can be associated with a first person authorized to have the access to the first other system. The second pattern can be associated with a second person authorized to have the access to the first other system.

For example, a lower body portion, of another person who has an eye, can be stationary at the seat 126. For example, another pattern can include a path formed by a movement of the eye of the other person, when the other person is at the seat 126, to view, in another sequence, other specific objects: the speedometer gage 150 (F) displayed on the instrument display 148, the right outdoor rearview mirror 112 (G), a spot 168 (H) displayed on the head up display 140, and the upper right corner 166 (I) of the windshield 120.

In a configuration, for example, the instructions to cause the access to the first other system to be authorized can include instructions to cause, based on a result of a comparison between the trajectory and the pattern, the access to the first other system to be authorized.

For example, the trajectory can include feature points. The feature points can be one or more of a fixation point or a corner between a first section of the trajectory and a second section of the trajectory. A feature point, of the feature points, can be associated with a corresponding specific object. The instructions to cause, based on the result of the comparison between the trajectory and the pattern, the access to the first other system to be authorized can include instructions to cause, in response to: (1) a sequence, in which the feature points along the trajectory are viewed, matching the sequence of the specific objects along the path of the pattern and (2) a distance, between the feature point and the corresponding specific object, being less than a first threshold distance, the access to the first other system to be authorized.

Figure 3:
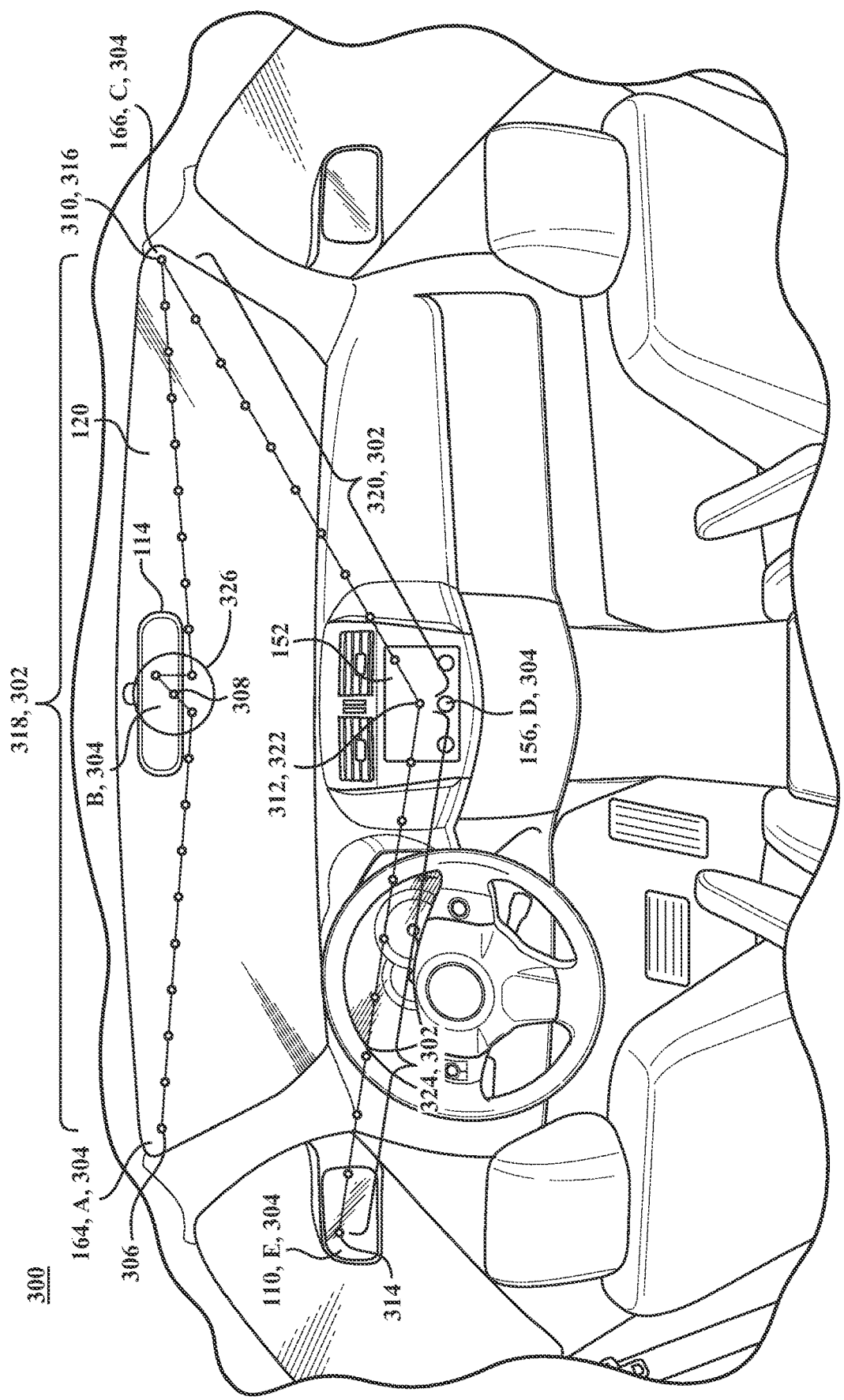
FIG. 3 includes a diagram that illustrates an example of a trajectory of a point of gaze of an eye to view, in a sequence, specific objects, according to the disclosed technologies.

FIG. 3 includes a diagram 300 that illustrates an example of a trajectory 302 of a point of gaze of an eye to view, in a sequence, specific objects 304, according to the disclosed technologies. The specific objects 304 can include, for example, the upper left corner 164 (A) of the windshield 120, the indoor rearview mirror 114 (B), the upper right corner 166 (C) of the windshield 120, the volume control device 156 (D) displayed on the console display 152, and the left outdoor rearview mirror 110 (E). The trajectory 302 can be represented, for example, by one or more points, per unit of time or unit of space, along a path formed by a movement of the eye. In the diagram 300, for example, a spacing between two adjacent points in the trajectory 302 can be twenty-five milliseconds.

The trajectory 302 can include, for example, a first feature point 306, a second feature point 308, a third feature point 310, a fourth feature point 312, and a fifth feature point 314. The first feature point 306 can correspond to the upper left corner 164 (A) of the windshield 120. A distance between the first feature point 306 and the upper left corner 160 (A) of the windshield 120 can be, for example, 3¼ centimeters. The second feature point 308 can correspond to the indoor rearview mirror 114 (B). A distance between the second feature point 308 and the indoor rearview mirror 114 (B) can be, for example, 3 centimeters. The third feature point 310 can correspond to the upper right corner 166 (C) of the windshield 120. The third feature point 310 can be a corner 316 between a first section 318 of the trajectory 302 and a second section 320 of the trajectory 302. A distance between the third feature point 310 and the upper right corner 166 (C) of the windshield 120 can be, for example, 2¾ centimeters.

The fourth feature point 312 can correspond to the volume control device 156 (D) displayed on the console display 152. The fourth feature point 312 can be a corner 322 between the second section 320 of the trajectory 302 and a third section 324 of the trajectory 302. A distance between the fourth feature point 312 and the volume control device 156 (D) displayed on the console display 152 can be, for example, 3½ centimeters. The fifth feature point 314 can correspond to the left outdoor rearview mirror 110 (E). A distance between the fifth feature point 314 and the left outdoor rearview mirror 110 (E) can be, for example, 3 centimeters.

For example, if the first threshold distance is 3¾ centimeters, then because: (1) the sequence, in which the first feature point 306, the second feature point 308, the third feature point 310, the fourth feature point 312, and the fifth feature point 314 along the trajectory 302 are viewed, matches the sequence of the specific objects 304 along the path of the pattern and (2) the distance, between each of the first feature point 306, the second feature point 308, the third feature point 310, the fourth feature point 312, and the fifth feature point 314 and the specific object that corresponds to the feature point, is less than the first threshold distance, the access to the first other system can be authorized.

The diagram 300 can also include, for example, a circle 326 centered on the second feature point 308. The circle 326 can have, for example, a radius of 4 centimeters.

For example, a fixation point can be a portion of the trajectory that is within a circle for a duration of time. The circle can have a radius that is less than a threshold radius. The duration of time can be greater than a threshold duration.

For example, if the threshold radius is 5 centimeters and the threshold duration is 50 milliseconds, then because the portion of the trajectory 302 associated with the second feature point 308 is within the circle 326 for at least 75 milliseconds, the second feature point 308 can be a fixation point.

In a variation of this configuration, for example, the instructions to cause, based on the result of the comparison between the trajectory and the pattern, the access to the first other system to be authorized can further include instructions to cause, in response to the distance between the feature point and the corresponding specific object being greater than a second threshold distance, the access to the first other system to be authorized. The second threshold distance can be, for example, a difference of a specific value subtracted from the first threshold distance, a percentage of the first threshold distance, or the like.

For example, if the first threshold distance is 3¾ centimeters and the second threshold distance is 2½ centimeters, then because: (1) the sequence, in which the first feature point 306, the second feature point 308, the third feature point 310, the fourth feature point 312, and the fifth feature point 314 along the trajectory 302 are viewed, matches the sequence of the specific objects 304 along the path of the pattern, (2) the distance, between each of the first feature point 306, the second feature point 308, the third feature point 310, the fourth feature point 312, and the fifth feature point 314 and the specific object that corresponds to the feature point, is less than the first threshold distance, and (3) the distance, between each of the first feature point 306, the second feature point 308, the third feature point 310, the fourth feature point 312, and the fifth feature point 314 and the specific object that corresponds to the feature point, is greater than the second threshold distance, the access to the first other system can be authorized. Ensuring that the distance, between each of the first feature point 306, the second feature point 308, the third feature point 310, the fourth feature point 312, and the fifth feature point 314 and the specific object that corresponds to the feature point, is between the first threshold distance and the second threshold distance can ensure that the trajectory sufficiently matches the pattern.

In this variation, additionally or alternatively, for example, the instructions to cause, based on the result of the comparison between the trajectory and the pattern, the access to the first other system to be authorized can further include instructions to cause, in response to a count of the feature points being within a threshold count of a count of the specific objects, the access to the first other system to be authorized. A first set can include the specific objects. The first set can have the count of the specific objects. A second set can include the feature points. The second set can have the count of the feature points.

For example, if the first threshold distance is 3½ centimeters, then the second set can include the first feature point 306 (which has a distance between the first feature point 306 and the upper left corner 164 (A) of the windshield 120 of 3¼ centimeters), the second feature point 308 (which has a distance between the second feature point 308 and the indoor rearview mirror 114 (B) of 3 centimeters), the third feature point 310 (which has a distance between the third feature point 310 and the upper right corner 166 (C) of the windshield 120 of 2¾ centimeters), and the fifth feature point 314 (which has a distance between the fifth feature point 314 and the left outdoor rearview mirror 110 (E) of 3 centimeters), but can exclude the fourth feature point 312 (which has a distance between the fourth feature point 312 and the volume control device 156 (D) displayed on the console display 152 of 3½ centimeters. Therefore, the second set can have a count of four while the first set can have a count of five. If the threshold count is one, then because: (1) the sequence, in which the first feature point 306, the second feature point 308, the third feature point 310, the fourth feature point 312, and the fifth feature point 314 along the trajectory 302 are viewed, matches the sequence of the specific objects 304 along the path of the pattern, (2) the count of the feature points (four) is within the threshold count (one) of the count of the specific objects 304 (five), and (3) the distance, between each of the feature points and the specific object that corresponds to the feature point, is less than the first threshold distance, the access to the first other system can be authorized. Ensuring that the count of the feature points is within the threshold count of the count of the specific objects 304 can ensure that the trajectory sufficiently matches the pattern.

Returning to FIG. 2, for example, the first other system can include a personalization system. The personalization system can be configured to cause a setting of a third other system to be set to a specific value. For example, the specific value can be one of a first specific value or a second specific value. The first specific value can be associated with a first person. The second specific value can be associated with a second person. As described above, the pattern can be one of a first pattern or a second pattern. The first pattern can be associated with the first person authorized to have the access to the first other system. The second pattern can be associated with the second person authorized to have the access to the first other system. In response to the pattern being the first pattern, the personalization system can set the specific value to the first specific value. In response to the pattern being the second pattern, the personalization system can set the specific value to the second specific value.

For example, if the processor 202 and the memory 204 are disposed on a vehicle, then the third other system can include one or more components of the vehicle. For example, the one or more components and associated one or more settings can include a position of a seat, a height of the seat, a degree to which the seat reclines, a position of a ventilation duct, a direction of the ventilation duct, a temperature of a heating system or an air conditioning system, a speed of a fan of a ventilation system, a position of a rearview mirror, a tilt angle of a steering wheel, a longitudinal position of the steering wheel, a volume of a speaker, a tuner of a radio, or the like. In response to the pattern being the first pattern, the personalization system can set the one or more settings associated with the one or more components to first specific values associated with the first person. In response to the pattern being the second pattern, the personalization system can set the one or more settings associated with the one or more components to second specific values associated with the second person.

In a configuration, for example, the first authorization process can exclude use of personally identifiable information (PII) of a person who has the eye. Personally identifiable information (PII) can include any information related to an identifiable person. Personally identifiable information (PII) can include, for example, face recognition information, iris recognition information, fingerprint recognition information, voice recognition information, or the like.

In a configuration, for example, the instructions to cause the access to the first other system to be authorized can further include instructions to cause, based on a result of a second authorization process, the access to the first other system to be authorized.

For example, the system 200 can further include a data store 214. The data store 214 can be communicably coupled to the processor 202. The data store 214 can store, for example, a database of images of irises of eyes 216. For example, the second authorization process can include a comparison, using the iris recognition process, between a first image and a second image. The first image can be in a recording of the trajectory and can be of an iris of the eye. The eye can be of a person for which the recording of the trajectory was produced. The second image can be in the database of images of irises of eyes. The second image can be associated with a person authorized to have the access to the first other system.

For example, the iris recognition process can be a biometric identification process that uses one or more pattern recognition techniques with respect to one or more images of one or both irises of one or both eyes of a person. Because each person can have unique and stable patterns in the irises of the eyes, an iris recognition process can be used to identify the person. However, for this reason, the unique and stable patterns in the irises of the eyes of the person can be considered to be personally identifiable information (PII) of the person.

Additionally or alternatively, for example, the second authorization process can include an activation of a remote keyless system. For example, the remote keyless system can be associated with a third other system. The third other system can be configured to control access to a compartment. The first authorization process can occur within the compartment. For example, the remote keyless system can include one or more of a remote keyless entry system, a remote keyless ignition system, or the like.

With reference to FIGS. 1 and 2, for example, if the processor 202 and the memory 204 are disposed on the vehicle 106, then the second authorization process can include the activation of the remote keyless entry system 136, which can control access to an interior of the vehicle 106. The first authorization process can occur within the interior of the vehicle 106. Additionally or alternatively, the second authorization process can include the activation of the remote keyless ignition system 134.

In a configuration, for example, the instructions to cause the gaze-tracking system to be calibrated can include instructions to cause a result of a comparison between the trajectory and the pattern to be used to calibrate the gaze-tracking system.

For example, the pattern can be one of a first pattern or a second pattern. The first pattern can be associated with a first person. The second pattern can be associated with a second person. In response to the pattern being the first pattern, the instructions to cause the gaze-tracking system to be calibrated can include instructions to cause a result of a comparison between the trajectory and the first pattern to be used to calibrate the gaze-tracking system for the first person. In response to the pattern being the second pattern, the instructions to cause the gaze-tracking system to be calibrated can include instructions to cause a result of a comparison between the trajectory and the second pattern to be used to calibrate the gaze-tracking system for the second person.

In a configuration, for example, the memory 204 can further store a recording module 218. The recording module 218 can include instructions that function to control the processor 202 to cause a recording of the trajectory to one or more of start or stop in response to an indication. The indication can include, for example, one or more of: (1) an initiation of visual information on a display, (2) an initiation of audio information on a speaker, (3) an initiation of touch information on a haptic device, (4) a signal received by one or more of a user device or an interface associated with a recording device, or (5) the like. For example, the visual information can include a presentation of one or more of an initial object before a presentation of the pattern or a final object after the presentation of the pattern. Additionally or alternatively, for example, the visual information can include a presentation of one or more of a specific color or a specific shape associated with one or more of an initial specific object in a sequence of the pattern or a final specific object in the sequence of the pattern. For example, the signal received by the one or more of the user device or the interface can be in response to a change in a position of a switch of the one or more of the user device or the interface. Additionally or alternatively, for example, the signal received by the one or more of the user device or the interface can be in response to a receipt of a voice command.

For example, if the processor 202 and the memory 204 are disposed on the vehicle 106, then the instructions to cause the recording of the trajectory can cause the recording device 132 to record the trajectory. For example, the instructions to cause the recording of the trajectory can include instructions to one or more of start or stop the recording device 132 in response to the indication. For example, the indication can include the initiation of the visual information on one or more of the head up display 140, the instrument display 148, or the console display 152. Additionally or alternatively, for example, the indication can include the initiation of the audio information on the speaker 146. Additionally or alternatively, for example, the indication can include the initiation of the touch information on the haptic device 162. Additionally or alternatively, for example, the signal can be received by one or more of the user device 108 or the interface 154 for the recording device 132.

In a configuration, for example, the processor 202 and the memory 204 can be configured to be disposed on a vehicle. In this configuration, for example, the first other system can include a system configured to change a state of a source of a propulsion force for the vehicle from an off state to an on state. In this configuration, additionally or alternatively, for example, the second other system can include an in-car entertainment system.

For example, if the vehicle is the vehicle 106, then the first other system 104 can include a system configured to change a state of the source 130 of the propulsion force for the vehicle 106 from the off state to the on state. Additionally or alternatively, for example, the second other system can include the in-car entertainment system 160. For example, in response to the gaze-tracking system 102 being calibrated, the gaze-tracking system 102 can be configured to be the user interface for the in-car entertainment system 160. For example, the gaze-tracking system 102 can be configured to cause, in response to a trajectory, of a point of gaze of an eye, with respect the control device 158 for the in-car entertainment system 160, a setting associated with the control device 158 to be changed to a different value.

In a configuration, for example, the instructions to cause the access to the first other system to be authorized can be configured to operate contemporaneously with the instructions to cause the gaze-tracking system to be calibrated.

In another configuration, for example: (1) the instructions to cause the access to the first other system to be authorized can be configured to operate at a first time, (2) the instructions to cause the gaze-tracking system to be calibrated can be configured to operate at a second time, and (3) the second time can be later than the first time. For example, in the configuration described above: (1) a situation in which a distance, between each of the feature points and a specific object that corresponds to the feature point, is between a first threshold distance and a second threshold distance, (2) a situation in which a count of feature points is within a threshold count of a count of specific objects, or (3) the like can be indicative of a situation in which access to the first other system can be authorized, but the gaze-tracking system may need to be calibrated at a later time.

Figure 4:
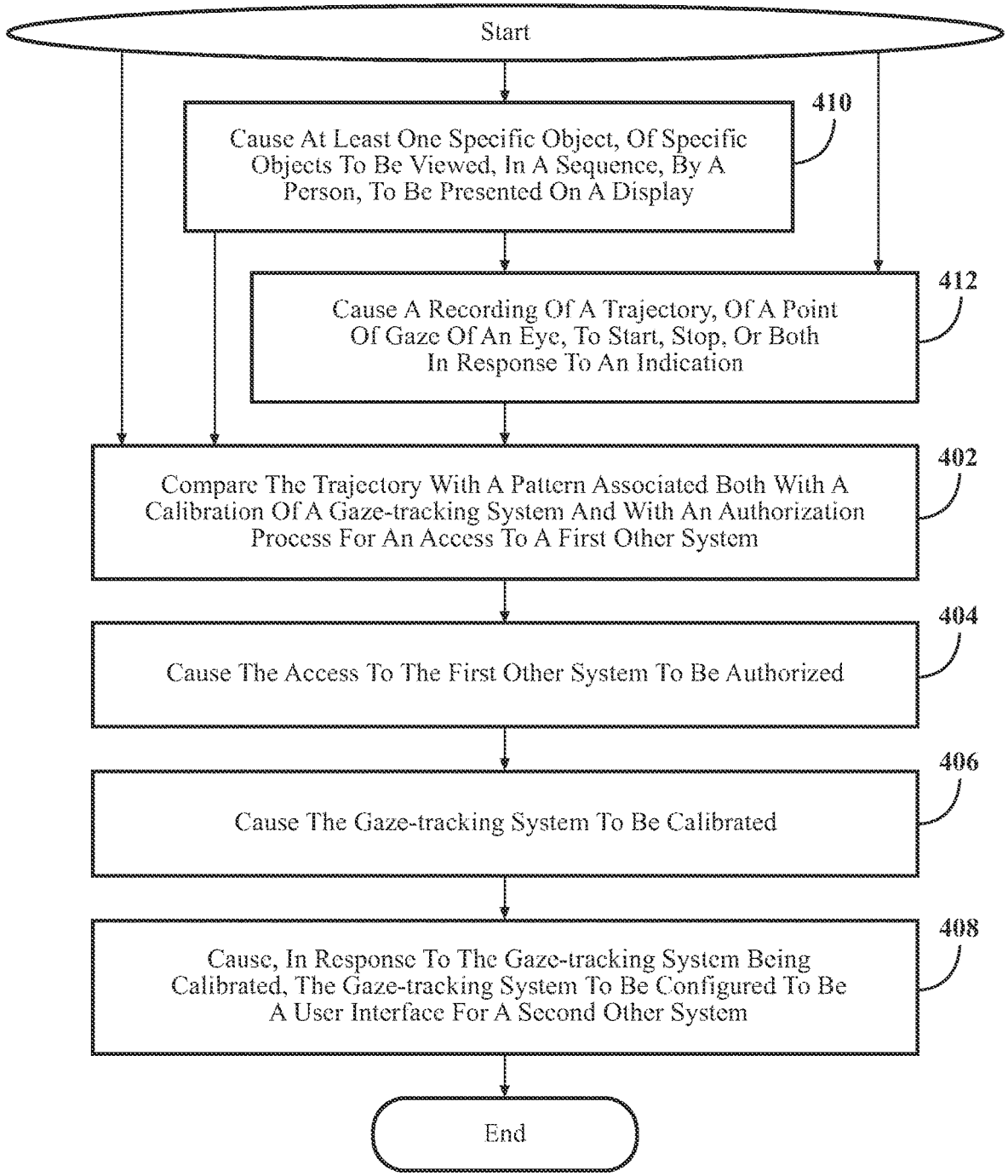
FIG. 4 includes a flow diagram that illustrates an example of a method that is associated with contemporaneously calibrating a gaze-tracking system and authorizing access to a first other system, according to the disclosed technologies.

FIG. 4 includes a flow diagram that illustrates an example of a method 400 that is associated with contemporaneously calibrating a gaze-tracking system and authorizing access to a first other system, according to the disclosed technologies. Although the method 400 is described in combination with the system 200 illustrated in FIG. 2, one of skill in the art understands, in light of the description herein, that the method 400 is not limited to being implemented by the system 200 illustrated in FIG. 2. Rather, the system 200 illustrated in FIG. 2 is an example of a system that may be used to implement the method 400. Additionally, although the method 400 is illustrated as a generally serial process, various aspects of the method 400 may be able to be executed in parallel.

In FIG. 4, in the method 400, at an operation 402, for example, the preliminary operations module 206 can compare a trajectory, of a point of gaze of an eye, with a pattern associated both with a calibration of the gaze-tracking system and with a first authorization process, that excludes an iris recognition process, for the first other system.

At an operation 404, for example, the authorization module 208 can cause an access to the first other system to be authorized.

At an operation 406, for example, the gaze-tracking module 210 can cause the gaze-tracking system to be calibrated.

At an operation 408, for example, the gaze-tracking module 210 can cause, in response to the gaze-tracking system being calibrated, the gaze-tracking system to be configured to be a user interface for a second other system.

For example, the second other system can include the first other system.

In a configuration, for example, the gaze-tracking system can be further configured to include an operator monitoring system. For example, if the system 200 is disposed on a vehicle, then the operator monitoring system can be used to determine a degree of drowsiness of an operator of the vehicle.

For example, a lower body portion, of a person who has the eye, can be stationary at a specific location at a time at which a recording of the trajectory is produced. For example, the pattern can include a path formed by a movement of the eye, when the person is at the specific location, to view, in a sequence, specific objects. For example, a specific object, of the specific objects, can have a corresponding location along the path of the pattern. For example, the specific objects can be real objects, objects presented on a display, or both.

At an operation 410, for example, the presentation module 212 can cause at least one of the specific objects to be presented on a display. For example, the display can include one or more of a head up display, a console display, an instrument panel, or the like.

For example, the pattern can be one of a first pattern or a second pattern. The first pattern can be associated with a first person authorized to have the access to the first other system. The second pattern can be associated with a second person authorized to have the access to the first other system.

In a configuration, for example, the authorization module 208 can cause, based on a result of a comparison between the trajectory and the pattern, the access to the first other system to be authorized.

For example, the trajectory can include feature points. The feature points can be one or more of a fixation point or a corner between a first section of the trajectory and a second section of the trajectory. A feature point, of the feature points, can be associated with a corresponding specific object. For example, the authorization module 208 can cause, in response to: (1) a sequence, in which the feature points along the trajectory are viewed, matching the sequence of the specific objects along the path of the pattern and (2) a distance, between the feature point and the corresponding specific object, being less than a first threshold distance, the access to the first other system to be authorized.

For example, a fixation point can be a portion of the trajectory that is within a circle for a duration of time. The circle can have a radius that is less than a threshold radius. The duration of time can be greater than a threshold duration.

In a variation of this configuration, for example, the authorization module 208 can cause, in response to the distance between the feature point and the corresponding specific object being greater than a second threshold distance, the access to the first other system to be authorized. The second threshold distance can be, for example, a difference of a specific value subtracted from the first threshold distance, a percentage of the first threshold distance, or the like.

In this variation, additionally or alternatively, for example, the authorization module 208 can cause, in response to a count of the feature points being within a threshold count of a count of the specific objects, the access to the first other system to be authorized. A first set can include the specific objects. The first set can have the count of the specific objects. A second set can include the feature points. The second set can have the count of the feature points.

For example, the first other system can include a personalization system. The personalization system can be configured to cause a setting of a third other system to be set to a specific value. For example, the specific value can be one of a first specific value or a second specific value. The first specific value can be associated with a first person. The second specific value can be associated with a second person. As described above, the pattern can be one of a first pattern or a second pattern. The first pattern can be associated with the first person authorized to have the access to the first other system. The second pattern can be associated with the second person authorized to have the access to the first other system. In response to the pattern being the first pattern, the personalization system can set the specific value to the first specific value. In response to the pattern being the second pattern, the personalization system can set the specific value to the second specific value.

For example, if the system 200 is disposed on a vehicle, then the third other system can include one or more components of the vehicle. For example, the one or more components and associated one or more settings can include a position of a seat, a height of the seat, a degree to which the seat reclines, a position of a ventilation duct, a direction of the ventilation duct, a temperature of a heating system or an air conditioning system, a speed of a fan of a ventilation system, a position of a rearview mirror, a tilt angle of a steering wheel, a longitudinal position of the steering wheel, a volume of a speaker, a tuner of a radio, or the like. In response to the pattern being the first pattern, the personalization system can set the one or more settings associated with the one or more components to first specific values associated with the first person. In response to the pattern being the second pattern, the personalization system can set the one or more settings associated with the one or more components to second specific values associated with the second person.

In a configuration, for example, the first authorization process can exclude use of personally identifiable information (PII) of a person who has the eye. Personally identifiable information (PII) can include any information related to an identifiable person. Personally identifiable information (PII) can include, for example, face recognition information, iris recognition information, fingerprint recognition information, voice recognition information, or the like.

In a configuration, for example, the authorization module 208 can cause, based on a result of a second authorization process, the access to the first other system to be authorized.

For example, the second authorization process can include a comparison, using the iris recognition process, between a first image and a second image. The first image can be in a recording of the trajectory and can be of an iris of the eye. The eye can be of a person for which the recording of the trajectory was produced. The second image can be in the database of images of irises of eyes. The second image can be associated with a person authorized to have the access to the first other system.

For example, the iris recognition process can be a biometric identification process that uses one or more pattern recognition techniques with respect to one or more images of one or both irises of one or both eyes of a person. Because each person can have unique and stable patterns in the irises of the eyes, an iris recognition process can be used to identify the person. However, for this reason, the unique and stable patterns in the irises of the eyes of the person can be considered to be personally identifiable information (PII) of the person.

Additionally or alternatively, for example, the second authorization process can include an activation of a remote keyless system. For example, the remote keyless system can be associated with a third other system. The third other system can be configured to control access to a compartment. The first authorization process can occur within the compartment. For example, the remote keyless system can include one or more of a remote keyless entry system, a remote keyless ignition system, or the like.

In a configuration, for example, the gaze-tracking module 210 can cause a result of a comparison between the trajectory and the pattern to be used to calibrate the gaze-tracking system.

For example, the pattern can be one of a first pattern or a second pattern. The first pattern can be associated with a first person. The second pattern can be associated with a second person. In response to the pattern being the first pattern, the gaze-tracking module 210 can cause a result of a comparison between the trajectory and the first pattern to be used to calibrate the gaze-tracking system for the first person. In response to the pattern being the second pattern, the gaze-tracking module 210 can cause a result of a comparison between the trajectory and the second pattern to be used to calibrate the gaze-tracking system for the second person.

In a configuration, at an operation 412, for example, the recording module 218 can cause a recording of the trajectory to one or more of start or stop in response to an indication. The indication can include, for example, one or more of: (1) an initiation of visual information on a display, (2) an initiation of audio information on a speaker, (3) an initiation of touch information on a haptic device, (4) a signal received by one or more of a user device or an interface associated with a recording device, or (5) the like. For example, the visual information can include a presentation of one or more of an initial object before a presentation of the pattern or a final object after the presentation of the pattern. Additionally or alternatively, for example, the visual information can include a presentation of one or more of a specific color or a specific shape associated with at one or more of an initial specific object in a sequence of the pattern or a final specific object in the sequence of the pattern. For example, the signal received by the one or more of the user device or the interface can be in response to a change in a position of a switch of the one or more of the user device or the interface. Additionally or alternatively, for example, the signal received by the one or more of the user device or the interface can be in response to a receipt of a voice command.

In a configuration, for example, the system 200 can be configured to be disposed on a vehicle. In this configuration, for example, the first other system can include a system configured to change a state of a source of a propulsion force for the vehicle from an off state to an on state. In this configuration, additionally or alternatively, for example, the second other system can include an in-car entertainment system.

In a configuration, for example, the authorization module 208 can be configured to operate contemporaneously with the gaze-tracking module 210.

In another configuration, for example: (1) the authorization module 208 can be configured to operate at a first time, (2) the gaze-tracking module 210 can be configured to operate at a second time, and (3) the second time can be later than the first time. For example, in the configuration described above: (1) a situation in which a distance, between each of the feature points and a specific object that corresponds to the feature point, is between a first threshold distance and a second threshold distance, (2) a situation in which a count of feature points is within a threshold count of a count of specific objects, or (3) the like can be indicative of a situation in which access to the first other system can be authorized, but the gaze-tracking system may need to be calibrated at a later time.

Figure 5:
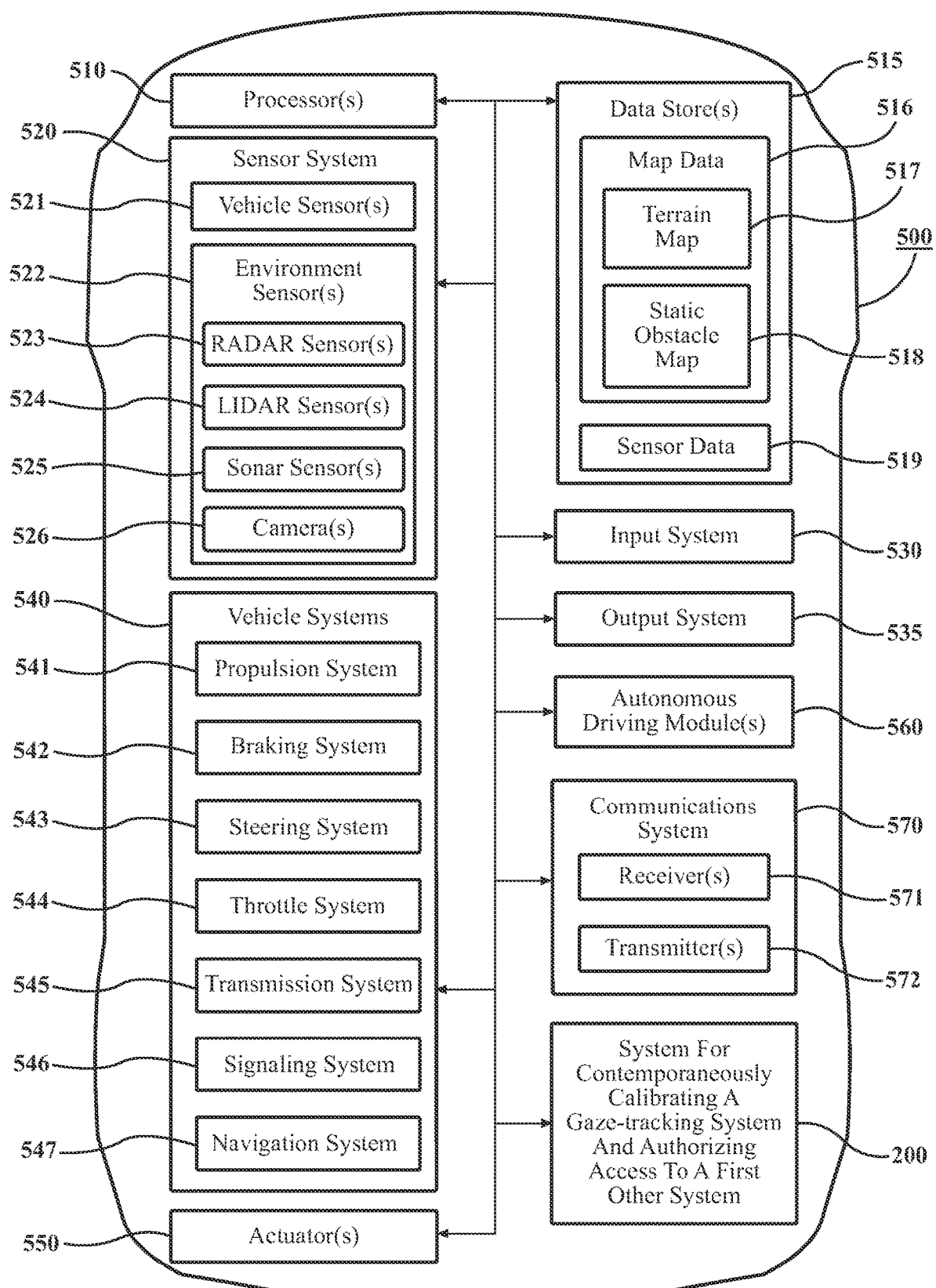
FIG. 5 includes a block diagram that illustrates an example of elements disposed on a vehicle, according to the disclosed technologies.

FIG. 5 includes a block diagram that illustrates an example of elements disposed on a vehicle 500, according to the disclosed technologies. As used herein, a "vehicle" can be any form of powered transport. In one or more implementations, the vehicle 500 can be an automobile. While arrangements described herein are with respect to automobiles, one of skill in the art understands, in light of the description herein, that embodiments are not limited to automobiles. For example, functions and/or operations of the vehicle 106 (illustrated in FIG. 1) can be realized by the vehicle 500.

In some embodiments, the vehicle 500 can be configured to switch selectively between an automated mode, one or more semi-automated operational modes, and/or a manual mode. Such switching can be implemented in a suitable manner, now known or later developed. As used herein, "manual mode" can refer that all of or a majority of the navigation and/or maneuvering of the vehicle 500 is performed according to inputs received from a user (e.g., human driver). In one or more arrangements, the vehicle 500 can be a conventional vehicle that is configured to operate in only a manual mode.

In one or more embodiments, the vehicle 500 can be an automated vehicle. As used herein, "automated vehicle" can refer to a vehicle that operates in an automated mode. As used herein, "automated mode" can refer to navigating and/or maneuvering the vehicle 500 along a travel route using one or more computing systems to control the vehicle 500 with minimal or no input from a human driver. In one or more embodiments, the vehicle 500 can be highly automated or completely automated. In one embodiment, the vehicle 500 can be configured with one or more semi-automated operational modes in which one or more computing systems perform a portion of the navigation and/or maneuvering of the vehicle along a travel route, and a vehicle operator (i.e., driver) provides inputs to the vehicle 500 to perform a portion of the navigation and/or maneuvering of the vehicle 500 along a travel route.

For example, Standard J3016, Taxonomy and Definitions for Terms Related to Driving Automation Systems for On-Road Motor Vehicles, issued by the Society of Automotive Engineers (SAE) International on Jan. 16, 2014, and most recently revised on Jun. 15, 2018, defines six levels of driving automation. These six levels include: (1) level 0, no automation, in which all aspects of dynamic driving tasks are performed by a human driver; (2) level 1, driver assistance, in which a driver assistance system, if selected, can execute, using information about the driving environment, either steering or acceleration/deceleration tasks, but all remaining driving dynamic tasks are performed by a human driver; (3) level 2, partial automation, in which one or more driver assistance systems, if selected, can execute, using information about the driving environment, both steering and acceleration/deceleration tasks, but all remaining driving dynamic tasks are performed by a human driver; (4) level 3, conditional automation, in which an automated driving system, if selected, can execute all aspects of dynamic driving tasks with an expectation that a human driver will respond appropriately to a request to intervene; (5) level 4, high automation, in which an automated driving system, if selected, can execute all aspects of dynamic driving tasks even if a human driver does not respond appropriately to a request to intervene; and (6) level 5, full automation, in which an automated driving system can execute all aspects of dynamic driving tasks under all roadway and environmental conditions that can be managed by a human driver.

The vehicle 500 can include various elements. The vehicle 500 can have any combination of the various elements illustrated in FIG. 5. In various embodiments, it may not be necessary for the vehicle 500 to include all of the elements illustrated in FIG. 5. Furthermore, the vehicle 500 can have elements in addition to those illustrated in FIG. 5. While the various elements are illustrated in FIG. 5 as being located within the vehicle 500, one or more of these elements can be located external to the vehicle 500. Furthermore, the elements illustrated may be physically separated by large distances. For example, as described, one or more components of the disclosed system can be implemented within the vehicle 500 while other components of the system can be implemented within a cloud-computing environment, as described below. For example, the elements can include one or more processors 510, one or more data stores 515, a sensor system 520, an input system 530, an output system 535, vehicle systems 540, one or more actuators 550, one or more automated driving modules 560, a communications system 570, and the system 200 for contemporaneously calibrating a gaze-tracking system and authorizing access to a first other system.

In one or more arrangements, the one or more processors 510 can be a main processor of the vehicle 500. For example, the one or more processors 510 can be an electronic control unit (ECU). For example, functions and/or operations of the processor 202 (illustrated in FIG. 2) can be realized by the one or more processors 510.

The one or more data stores 515 can store, for example, one or more types of data. The one or more data stores 515 can include volatile memory and/or non-volatile memory. For example, functions and/or operations of the memory 204, functions and/or operations of the data store 214, or any combination thereof (illustrated in FIG. 2) can be realized by the one or more data stores 515. Examples of suitable memory for the one or more data stores 515 can include Random-Access Memory (RAM), flash memory, Read-Only Memory (ROM), Programmable Read-Only Memory (PROM), Erasable Programmable Read-Only Memory (EPROM), Electrically Erasable Programmable Read-Only Memory (EEPROM), registers, magnetic disks, optical disks, hard drives, any other suitable storage medium, or any combination thereof. The one or more data stores 515 can be a component of the one or more processors 510. Additionally or alternatively, the one or more data stores 515 can be operatively connected to the one or more processors 510 for use thereby. As used herein, "operatively connected" can include direct or indirect connections, including connections without direct physical contact. As used herein, a statement that a component can be "configured to" perform an operation can be understood to mean that the component requires no structural alterations, but merely needs to be placed into an operational state (e.g., be provided with electrical power, have an underlying operating system running, etc.) in order to perform the operation.

In one or more arrangements, the one or more data stores 515 can store map data 516. The map data 516 can include maps of one or more geographic areas. In some instances, the map data 516 can include information or data on roads, traffic control devices, road markings, structures, features, and/or landmarks in the one or more geographic areas. The map data 516 can be in any suitable form. In some instances, the map data 516 can include aerial views of an area. In some instances, the map data 516 can include ground views of an area, including 360-degree ground views. The map data 516 can include measurements, dimensions, distances, and/or information for one or more items included in the map data 516 and/or relative to other items included in the map data 516. The map data 516 can include a digital map with information about road geometry. The map data 516 can be high quality and/or highly detailed.

In one or more arrangements, the map data 516 can include one or more terrain maps 517. The one or more terrain maps 517 can include information about the ground, terrain, roads, surfaces, and/or other features of one or more geographic areas. The one or more terrain maps 517 can include elevation data of the one or more geographic areas. The map data 516 can be high quality and/or highly detailed. The one or more terrain maps 517 can define one or more ground surfaces, which can include paved roads, unpaved roads, land, and other things that define a ground surface.

In one or more arrangements, the map data 516 can include one or more static obstacle maps 518. The one or more static obstacle maps 518 can include information about one or more static obstacles located within one or more geographic areas. A "static obstacle" can be a physical object whose position does not change (or does not substantially change) over a period of time and/or whose size does not change (or does not substantially change) over a period of time. Examples of static obstacles can include trees, buildings, curbs, fences, railings, medians, utility poles, statues, monuments, signs, benches, furniture, mailboxes, large rocks, and hills. The static obstacles can be objects that extend above ground level. The one or more static obstacles included in the one or more static obstacle maps 518 can have location data, size data, dimension data, material data, and/or other data associated with them. The one or more static obstacle maps 518 can include measurements, dimensions, distances, and/or information for one or more static obstacles. The one or more static obstacle maps 518 can be high quality and/or highly detailed. The one or more static obstacle maps 518 can be updated to reflect changes within a mapped area.

In one or more arrangements, the one or more data stores 515 can store sensor data 519. As used herein, "sensor data" can refer to any information about the sensors with which the vehicle 500 can be equipped including the capabilities of and other information about such sensors. The sensor data 519 can relate to one or more sensors of the sensor system 520. For example, in one or more arrangements, the sensor data 519 can include information about one or more lidar sensors 524 of the sensor system 520.

In some arrangements, at least a portion of the map data 516 and/or the sensor data 519 can be located in one or more data stores 515 that are located onboard the vehicle 500. Alternatively or additionally, at least a portion of the map data 516 and/or the sensor data 519 can be located in one or more data stores 515 that are located remotely from the vehicle 500.

The sensor system 520 can include one or more sensors. As used herein, a "sensor" can refer to any device, component, and/or system that can detect and/or sense something. The one or more sensors can be configured to detect and/or sense in real-time. As used herein, the term "real-time" can refer to a level of processing responsiveness that is perceived by a user or system to be sufficiently immediate for a particular process or determination to be made, or that enables the processor to keep pace with some external process.

In arrangements in which the sensor system 520 includes a plurality of sensors, the sensors can work independently from each other. Alternatively, two or more of the sensors can work in combination with each other. In such a case, the two or more sensors can form a sensor network. The sensor system 520 and/or the one or more sensors can be operatively connected to the one or more processors 510, the one or more data stores 515, and/or another element of the vehicle 500 (including any of the elements illustrated in FIG. 5). The sensor system 520 can acquire data of at least a portion of the external environment of the vehicle 500 (e.g., nearby vehicles). The sensor system 520 can include any suitable type of sensor. Various examples of different types of sensors are described herein. However, one of skill in the art understands that the embodiments are not limited to the particular sensors described herein.

The sensor system 520 can include one or more vehicle sensors 521. The one or more vehicle sensors 521 can detect, determine, and/or sense information about the vehicle 500 itself. In one or more arrangements, the one or more vehicle sensors 521 can be configured to detect and/or sense position and orientation changes of the vehicle 500 such as, for example, based on inertial acceleration. In one or more arrangements, the one or more vehicle sensors 521 can include one or more accelerometers, one or more gyroscopes, an inertial measurement unit (IMU), a dead-reckoning system, a global navigation satellite system (GNSS), a global positioning system (GPS), a navigation system 547, and/or other suitable sensors. The one or more vehicle sensors 521 can be configured to detect and/or sense one or more characteristics of the vehicle 500. In one or more arrangements, the one or more vehicle sensors 521 can include a speedometer to determine a current speed of the vehicle 500.

Alternatively or additionally, the sensor system 520 can include one or more environment sensors 522 configured to acquire and/or sense driving environment data. As used herein, "driving environment data" can include data or information about the external environment in which a vehicle is located or one or more portions thereof. For example, the one or more environment sensors 522 can be configured to detect, quantify, and/or sense obstacles in at least a portion of the external environment of the vehicle 500 and/or information/data about such obstacles. Such obstacles may be stationary objects and/or dynamic objects. The one or more environment sensors 522 can be configured to detect, measure, quantify, and/or sense other things in the external environment of the vehicle 500 such as, for example, lane markers, signs, traffic lights, traffic signs, lane lines, crosswalks, curbs proximate the vehicle 500, off-road objects, etc.

Various examples of sensors of the sensor system 520 are described herein. The example sensors may be part of the one or more vehicle sensors 521 and/or the one or more environment sensors 522. However, one of skill in the art understands that the embodiments are not limited to the particular sensors described.

In one or more arrangements, the one or more environment sensors 522 can include one or more radar sensors 523, one or more lidar sensors 524, one or more sonar sensors 525, and/or one more cameras 526. In one or more arrangements, the one or more cameras 526 can be one or more high dynamic range (HDR) cameras or one or more infrared (IR) cameras. For example, the one or more cameras 526 can be used to record a reality of a state of an item of information that can appear in the digital map.

The input system 530 can include any device, component, system, element, arrangement, or groups thereof that enable information/data to be entered into a machine. The input system 530 can receive an input from a vehicle passenger (e.g., a driver or a passenger). The output system 535 can include any device, component, system, element, arrangement, or groups thereof that enable information/data to be presented to a vehicle passenger (e.g., a driver or a passenger). For example, functions and/or operations of the interface 154 for the recording device 132, functions and/or operations of the volume control device 156 for the volume of the speaker 146, functions and/or operations of the control device 158 for the in-car entertainment system 160, or any combination thereof (illustrated in FIG. 1) can be realized by the input system 530. For example, functions and/or operations of the head up display 140, functions and/or operations of the speaker 146, functions and/or operations of the instrument display 148, functions and/or operations of the console display 152, functions and/or operations of the in-car entertainment system 160, functions and/or operations of the haptic device 162, or any combination thereof (illustrated in FIG. 1) can be realized by the output system 535.

Various examples of the one or more vehicle systems 540 are illustrated in FIG. 5. However, one of skill in the art understands that the vehicle 500 can include more, fewer, or different vehicle systems. Although particular vehicle systems can be separately defined, each or any of the systems or portions thereof may be otherwise combined or segregated via hardware and/or software within the vehicle 500. For example, the one or more vehicle systems 540 can include a propulsion system 541, a braking system 542, a steering system 543, a throttle system 544, a transmission system 545, a signaling system 546, and/or the navigation system 547. Each of these systems can include one or more devices, components, and/or a combination thereof, now known or later developed. For example, functions and/or operations of the source 130 of the propulsion force (illustrated in FIG. 1) can be realized by the propulsion system 541.

The navigation system 547 can include one or more devices, applications, and/or combinations thereof, now known or later developed, configured to determine the geographic location of the vehicle 500 and/or to determine a travel route for the vehicle 500. The navigation system 547 can include one or more mapping applications to determine a travel route for the vehicle 500. The navigation system 547 can include a global positioning system, a local positioning system, a geolocation system, and/or a combination thereof.

The one or more actuators 550 can be any element or combination of elements operable to modify, adjust, and/or alter one or more of the vehicle systems 540 or components thereof responsive to receiving signals or other inputs from the one or more processors 510 and/or the one or more automated driving modules 560. Any suitable actuator can be used. For example, the one or more actuators 550 can include motors, pneumatic actuators, hydraulic pistons, relays, solenoids, and/or piezoelectric actuators.

The one or more processors 510 and/or the one or more automated driving modules 560 can be operatively connected to communicate with the various vehicle systems 540 and/or individual components thereof. For example, the one or more processors 510 and/or the one or more automated driving modules 560 can be in communication to send and/or receive information from the various vehicle systems

540 to control the movement, speed, maneuvering, heading, direction, etc. of the vehicle 500. The one or more processors 510 and/or the one or more automated driving modules 560 may control some or all of these vehicle systems 540 and, thus, may be partially or fully automated.

The one or more processors 510 and/or the one or more automated driving modules 560 may be operable to control the navigation and/or maneuvering of the vehicle 500 by controlling one or more of the vehicle systems 540 and/or components thereof. For example, when operating in an automated mode, the one or more processors 510 and/or the one or more automated driving modules 560 can control the direction and/or speed of the vehicle 500. The one or more processors 510 and/or the one or more automated driving modules 560 can cause the vehicle 500 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" can mean to make, force, compel, direct, command, instruct, and/or enable an event or action to occur or at least be in a state where such event or action may occur, either in a direct or indirect manner.

The communications system 570 can include one or more receivers 571 and/or one or more transmitters 572. The communications system 570 can receive and transmit one or more messages through one or more wireless communications channels. For example, the one or more wireless communications channels can be in accordance with the Institute of Electrical and Electronics Engineers (IEEE) 802.11p standard to add wireless access in vehicular environments (WAVE) (the basis for Dedicated Short-Range Communications (DSRC)), the 3rd Generation Partnership Project (3GPP) Long-Term Evolution (LTE) Vehicle-to-Everything (V2X) (LTE-V2X) standard (including the LTE Uu interface between a mobile communication device and an Evolved Node B of the Universal Mobile Telecommunications System), the 3GPP fifth generation (5G) New Radio (NR) Vehicle-to-Everything (V2X) standard (including the 5G NR Uu interface), or the like. For example, the communications system 570 can include "connected vehicle" technology. "Connected vehicle" technology can include, for example, devices to exchange communications between a vehicle and other devices in a packet-switched network. Such other devices can include, for example, another vehicle (e.g., "Vehicle to Vehicle" (V2V) technology), roadside infrastructure (e.g., "Vehicle to Infrastructure" (V2I) technology), a cloud platform (e.g., "Vehicle to Cloud" (V2C) technology), a pedestrian (e.g., "Vehicle to Pedestrian" (V2P) technology), or a network (e.g., "Vehicle to Network" (V2N) technology. "Vehicle to Everything" (V2X) technology can integrate aspects of these individual communications technologies.

Moreover, the one or more processors 510, the one or more data stores 515, and the communications system 570 can be configured to one or more of form a micro cloud, participate as a member of a micro cloud, or perform a function of a leader of a mobile micro cloud. A micro cloud can be characterized by a distribution, among members of the micro cloud, of one or more of one or more computing resources or one or more data storage resources in order to collaborate on executing operations. The members can include at least connected vehicles.

The vehicle 500 can include one or more modules, at least some of which are described herein. The modules can be implemented as computer-readable program code that, when executed by the one or more processors 510, implement one or more of the various processes described herein. One or more of the modules can be a component of the one or more processors 510. Alternatively or additionally, one or more of the modules can be executed on and/or distributed among other processing systems to which the one or more processors 510 can be operatively connected. The modules can include instructions (e.g., program logic) executable by the one or more processors 510. Alternatively or additionally, the one or more data store 515 may contain such instructions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

The vehicle 500 can include one or more automated driving modules 560. The one or more automated driving modules 560 can be configured to receive data from the sensor system 520 and/or any other type of system capable of capturing information relating to the vehicle 500 and/or the external environment of the vehicle 500. In one or more arrangements, the one or more automated driving modules 560 can use such data to generate one or more driving scene models. The one or more automated driving modules 560 can determine position and velocity of the vehicle 500. The one or more automated driving modules 560 can determine the location of obstacles, obstacles, or other environmental features including traffic signs, trees, shrubs, neighboring vehicles, pedestrians, etc.

The one or more automated driving modules 560 can be configured to receive and/or determine location information for obstacles within the external environment of the vehicle 500 for use by the one or more processors 510 and/or one or more of the modules described herein to estimate position and orientation of the vehicle 500, vehicle position in global coordinates based on signals from a plurality of satellites, or any other data and/or signals that could be used to determine the current state of the vehicle 500 or determine the position of the vehicle 500 with respect to its environment for use in either creating a map or determining the position of the vehicle 500 in respect to map data.

The one or more automated driving modules 560 can be configured to determine one or more travel paths, current automated driving maneuvers for the vehicle 500, future automated driving maneuvers and/or modifications to current automated driving maneuvers based on data acquired by the sensor system 520, driving scene models, and/or data from any other suitable source such as determinations from the sensor data 519. As used herein, "driving maneuver" can refer to one or more actions that affect the movement of a vehicle. Examples of driving maneuvers include: accelerating, decelerating, braking, turning, moving in a lateral direction of the vehicle 500, changing travel lanes, merging into a travel lane, and/or reversing, just to name a few possibilities. The one or more automated driving modules 560 can be configured to implement determined driving maneuvers. The one or more automated driving modules 560 can cause, directly or indirectly, such automated driving maneuvers to be implemented. As used herein, "cause" or "causing" means to make, command, instruct, and/or enable an event or action to occur or at least be in a state where such event or action may occur, either in a direct or indirect manner. The one or more automated driving modules 560 can be configured to execute various vehicle functions and/or to transmit data to, receive data from, interact with, and/or control the vehicle 500 or one or more systems thereof (e.g., one or more of vehicle systems 540). For example, functions and/or operations of an automotive navigation system can be realized by the one or more automated driving modules 560.

Detailed embodiments are disclosed herein. However, one of skill in the art understands, in light of the description herein, that the disclosed embodiments are intended only as examples. Therefore, specific structural and functional details disclosed herein are not to be interpreted as limiting, but merely as a basis for the claims and as a representative basis for teaching one of skill in the art to variously employ the aspects herein in virtually any appropriately detailed structure. Furthermore, the terms and phrases used herein are not intended to be limiting but rather to provide an understandable description of possible implementations. Various embodiments are illustrated in FIGS. 1-5, but the embodiments are not limited to the illustrated structure or application.

The flowchart and block diagrams in the figures illustrate the architecture, functionality, and operation of possible implementations of systems, methods, and computer program products according to various embodiments. In this regard, each block in flowcharts or block diagrams may represent a module, segment, or portion of code, which comprises one or more executable instructions for implementing the specified logical function(s). One of skill in the art understands, in light of the description herein, that, in some alternative implementations, the functions described in a block may occur out of the order depicted by the figures. For example, two blocks depicted in succession may, in fact, be executed substantially concurrently, or the blocks may be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suitable. A typical combination of hardware and software can be a processing system with computer-readable program code that, when loaded and executed, controls the processing system such that it carries out the methods described herein. The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product that comprises all the features enabling the implementation of the methods described herein and that, when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. As used herein, the phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples of the computer-readable storage medium would include, in a non-exhaustive list, the following: a portable computer diskette, a hard disk drive (HDD), a solid-state drive (SSD), a read-only memory (ROM), an erasable programmable read-only memory (EPROM or flash memory), a portable compact disc read-only memory (CD-ROM), a digital versatile disc (DVD), an optical storage device, a magnetic storage device, or any suitable combination of the foregoing. As used herein, a computer-readable storage medium may be any tangible medium that can contain or store a program for use by or in connection with an instruction execution system, apparatus, or device.

Generally, modules, as used herein, include routines, programs, objects, components, data structures, and so on that perform particular tasks or implement particular data types. In further aspects, a memory generally stores such modules. The memory associated with a module may be a buffer or may be cache embedded within a processor, a random-access memory (RAM), a ROM, a flash memory, or another suitable electronic storage medium. In still further aspects, a module as used herein, may be implemented as an application-specific integrated circuit (ASIC), a hardware component of a system on a chip (SoC), a programmable logic array (PLA), or another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the disclosed technologies may be written in any combination of one or more programming languages, including an object-oriented programming language such as Java™, Smalltalk, C++, or the like, and conventional procedural programming languages such as the "C" programming language or similar programming languages. The program code may execute entirely on a user's computer, partly on a user's computer, as a stand-alone software package, partly on a user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . or . . . " as used herein refers to and encompasses any and all possible combinations of one or more of the associated listed items. For example, the phrase "at least one of A, B, or C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system, comprising:
a processor; and
a memory storing:
a preliminary operations module including instructions that, when executed by the processor, cause the processor to compare a trajectory, of a point of gaze of an eye, with a pattern associated both with a calibration of a gaze-tracking system and with a first authorization process, that excludes an iris recognition process, for a first other system;
an authorization module including instructions that, when executed by the processor, cause the processor to cause, in response to distances between feature points, included in the trajectory, and corresponding specific objects, viewed by a movement of the eye along a path of the pattern, being between a second threshold distance and a first threshold distance, an access to the first other system to be authorized, wherein each of the first threshold distance and the second threshold distance has a value other than zero; and
a gaze-tracking module including instructions that, when executed by the processor, cause the processor to:
cause the gaze-tracking system to be calibrated; and
cause, in response to the gaze-tracking system being calibrated, the gaze-tracking system to be configured to be a user interface for a second other system.

2. The system of claim 1, wherein:
a lower body portion, of a person who has the eye, is stationary at a specific location at a time at which a recording of the trajectory is produced, and
the pattern comprises the path formed by the movement of the eye, when the person is at the specific location, to view, in a sequence, specific objects.

3. The system of claim 2, wherein the memory further stores a presentation module, the presentation module including instructions that, when executed by the processor, cause the processor to cause at least one of the specific objects to be presented on a display.

4. The system of claim 2, wherein:
the instructions to cause the access to the first other system to be authorized include instructions to cause, based on a result of a comparison between the trajectory and the pattern, the access to the first other system to be authorized,
a specific object, of the specific objects, has a corresponding location along the path of the pattern,
the trajectory includes the feature points, the feature points being at least one of a fixation point or a corner between a first section of the trajectory and a second section of the trajectory,
a feature point, of the feature points, is associated with a corresponding specific object, and
the instructions to cause, based on the result of the comparison between the trajectory and the pattern, the access to the first other system to be authorized include instructions to cause, in response to a sequence, in which the feature points along the trajectory are viewed, matching the sequence of the specific objects along the path of the pattern, the access to the first other system to be authorized.

5. The system of claim 4, wherein the fixation point is a portion of the trajectory that is within a circle for a duration of time, the circle having a radius that is less than a threshold radius, the duration of time being greater than a threshold duration.

6. The system of claim 4, wherein:
a first set includes the specific objects, the first set having a count of the specific objects,
a second set includes the feature points, the second set having a count of the feature points, and
the instructions to cause, based on the result of the comparison between the trajectory and the pattern, the access to the first other system to be authorized further include instructions to cause, in response to the count of the feature points being within a threshold count of the count of the specific objects, the access to the first other system to be authorized.

7. The system of claim 1, wherein the instructions to cause the access to the first other system to be authorized further include instructions to cause, based on a result of a second authorization process, the access to the first other system to be authorized.

8. The system of claim 7, further comprising a data store configured to store a database of images of irises of eyes, wherein:
the second authorization process comprises a comparison, using the iris recognition process, between a first image and a second image,
the first image is in a recording of the trajectory and is of an iris of the eye,
the second image is in the database of images of irises of eyes, and
the second image is associated with a person authorized to have the access to the first other system.

9. The system of claim 7, wherein the second authorization process comprises an activation of a remote keyless system.

10. The system of claim 1, wherein:
the instructions to cause the gaze-tracking system to be calibrated include instructions to cause a result of a comparison between the trajectory and the pattern to be used to calibrate the gaze-tracking system,
the pattern is one of a first pattern or a second pattern, the first pattern being associated with a first person, the second pattern being associated with a second person,
in response to the pattern being the first pattern, the instructions to cause the gaze-tracking system to be calibrated include instructions to cause a result of a comparison between the trajectory and the first pattern to be used to calibrate the gaze-tracking system for the first person, and
in response to the pattern being the second pattern, the instructions to cause the gaze-tracking system to be calibrated include instructions to cause a result of a comparison between the trajectory and the second pattern to be used to calibrate the gaze-tracking system for the second person.

11. The system of claim 1, wherein the memory further stores a recording module, the recording module including instructions that, when executed by the processor, cause the processor to cause a recording of the trajectory to at least one of start or stop in response to an indication.

12. The system of claim 11, wherein the indication comprises at least one of:
an initiation of visual information on a display,
an initiation of audio information on a speaker,
an initiation of touch information on a haptic device, or
a signal received by at least one of a user device or an interface associated with a recording device.

13. A system, comprising:
a processor configured to be disposed on a vehicle;
a memory configured to be disposed on the vehicle and storing:
  a preliminary operations module including instructions that, when executed by the processor, cause the processor to compare a trajectory, of a point of gaze of an eye, with a pattern associated both with a calibration of a gaze-tracking system and with a first authorization process, that excludes an iris recognition process, for a first other system, the first other system comprising a system configured to change a state of a source of a propulsion force for the vehicle from an off state to an on state;
  an authorization module including instructions that, when executed by the processor, cause the processor to cause an access to the first other system to be authorized; and
  a gaze-tracking module including instructions that, when executed by the processor, cause the processor to:
    cause the gaze-tracking system to be calibrated; and
    cause, in response to the gaze-tracking system being calibrated, the gaze-tracking system to be configured to be a user interface for a second other system, the second other system comprising an in-car entertainment system.

14. A method, comprising:
comparing, by a processor, a trajectory, of a point of gaze of an eye, with a pattern associated both with a calibration of a gaze-tracking system and with a first authorization process, that excludes an iris recognition process, for a first other system;
causing, by the processor and in response to distances between feature points, included in the trajectory, and corresponding specific objects, viewed by a movement of the eye along a path of the pattern, being between a second threshold distance and a first threshold distance, an access to the first other system to be authorized, wherein each of the first threshold distance and the second threshold distance has a value other than zero;
causing, by the processor, the gaze-tracking system to be calibrated; and
causing, by the processor and in response to the gaze-tracking system being calibrated, the gaze-tracking system to be configured to be a user interface for a second other system.

15. The method of claim 14, wherein:
the pattern is one of a first pattern or a second pattern, the first pattern being associated with a first person authorized to have the access to the first other system, the second pattern being associated with a second person authorized to have the access to the first other system,
the first other system comprises a personalization system configured to cause a setting of a third other system to be set to a specific value, the specific value being one of a first specific value or a second specific value, the first specific value being associated with the first person, the second specific value being associated with the second person,
in response to the pattern being the first pattern, the personalization system sets the specific value to the first specific value, and
in response to the pattern being the second pattern, the personalization system sets the specific value to the second specific value.

16. The method of claim 14, wherein the causing the access to the first other system to be authorized occurs contemporaneously with the causing the gaze-tracking system to be calibrated.

17. The method of claim 14, wherein:
the causing the access to the first other system to be authorized occurs at a first time,
the causing the gaze-tracking system to be calibrated occurs at a second time, and
the second time is later than the first time.

18. The method of claim 14, wherein the first authorization process excludes use of personally identifiable information of a person who has the eye.

19. A non-transitory computer-readable medium for contemporaneously calibrating a gaze-tracking system and authorizing access to a first other system, the non-transitory computer-readable medium including instructions that, when executed by one or more processors, cause the one or more processors to:
compare a trajectory, of a point of gaze of an eye, with a pattern associated both with a calibration of the gaze-tracking system and with a first authorization process, that excludes an iris recognition process, for the first other system;
cause, in response to distances between feature points, included in the trajectory, and corresponding specific objects, viewed by a movement of the eye along a path of the pattern, being between a second threshold distance and a first threshold distance, an access to the first other system to be authorized, wherein each of the first threshold distance and the second threshold distance has a value other than zero;
cause the gaze-tracking system to be calibrated; and
cause, in response to the gaze-tracking system being calibrated, the gaze-tracking system to be configured to be a user interface for a second other system.

20. The system of claim 1, wherein the second distance is one of:
a difference of a specific value subtracted from the first threshold distance, or
a percentage of the first threshold distance.

* * * * *